US012596220B2

(12) United States Patent
Sugiyama et al.

(10) Patent No.: US 12,596,220 B2
(45) Date of Patent: Apr. 7, 2026

(54) LIGHT GUIDE PLATE, LIGHT GUIDE PLATE UNIT, AND DISPLAY DEVICE

(71) Applicant: Panasonic Intellectual Property Management Co., Ltd., Osaka (JP)

(72) Inventors: Keiji Sugiyama, Kyoto (JP); Ken'ichi Kasazumi, Osaka (JP); Yukihiro Chokyu, Osaka (JP); Satoshi Kuzuhara, Osaka (JP); Kazuhiro Minami, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 251 days.

(21) Appl. No.: 18/373,753

(22) Filed: Sep. 27, 2023

(65) Prior Publication Data

US 2024/0019621 A1      Jan. 18, 2024

Related U.S. Application Data

(63) Continuation of application No. PCT/JP2022/000017, filed on Jan. 4, 2022.

(30) Foreign Application Priority Data

Mar. 31, 2021    (JP) ................................. 2021-058956
Mar. 31, 2021    (JP) ................................. 2021-058962

(51) Int. Cl.
*G02B 5/32*       (2006.01)
*B60K 35/10*      (2024.01)
*B60K 35/23*      (2024.01)
*F21V 8/00*       (2006.01)

(52) U.S. Cl.
CPC ............ *G02B 6/0041* (2013.01); *B60K 35/10* (2024.01); *B60K 35/23* (2024.01); *G02B 5/32* (2013.01); *G02B 6/0031* (2013.01); *G02B 6/0076* (2013.01)

(58) Field of Classification Search
None
See application file for complete search history.

(56) References Cited

U.S. PATENT DOCUMENTS

| | | | |
|---|---|---|---|
| 5,892,597 A | 4/1999 | Iwata et al. | |
| 2017/0329075 A1 | 11/2017 | Yeoh et al. | |
| 2017/0329140 A1 | 11/2017 | Yeoh et al. | |

(Continued)

FOREIGN PATENT DOCUMENTS

| | | |
|---|---|---|
| JP | 05-072959 | 3/1993 |
| JP | 2019-510995 | 4/2019 |

(Continued)

OTHER PUBLICATIONS

Office Action issued in Corresponding JP Patent Application No. 2021-058956, dated Sep. 10, 2024, along with an English translation thereof.

(Continued)

*Primary Examiner* — Chad H Smith

(74) *Attorney, Agent, or Firm* — Greenblum & Bernstein, P.L.C.

(57) ABSTRACT

A light guide plate includes a hologram element that is a first hologram element including two or more diffraction cells, and a hologram element that is a second hologram element including a single diffraction cell.

20 Claims, 8 Drawing Sheets

(56) References Cited

U.S. PATENT DOCUMENTS

| | | | | |
|---|---|---|---|---|
| 2018/0210205 A1* | 7/2018 | Grey | ................. | G02B 27/4272 |
| 2018/0292647 A1 | 10/2018 | Fattal | | |
| 2019/0121027 A1* | 4/2019 | Popovich | ............ | G02B 6/2773 |
| 2020/0183163 A1* | 6/2020 | Waldern | ............ | G02B 27/0172 |
| 2020/0264378 A1* | 8/2020 | Grant | ...................... | G02B 6/34 |
| 2022/0091421 A1 | 3/2022 | Kasegawa | | |

FOREIGN PATENT DOCUMENTS

| | | | | |
|---|---|---|---|---|
| JP | 2019-522230 | 8/2019 | | |
| JP | 2019-184920 | 10/2019 | | |
| JP | 2020-112746 | 7/2020 | | |
| JP | 2020-519962 | 7/2020 | | |
| WO | WO-2016171705 A1 * | 10/2016 | .......... | G02B 6/0036 |
| WO | 2017/123259 | 7/2017 | | |
| WO | 2017/197020 | 11/2017 | | |
| WO | 2018/213388 | 11/2018 | | |

OTHER PUBLICATIONS

International Search Report issued in International Pat. Appl. No. PCT/JP2022/000017, dated Mar. 29, 2022, along with an English translation thereof.
Office Action issued in Corresponding JP Patent Application No. 2021-058956, dated Dec. 24, 2024, along with an English translation thereof.
Office Action issued in Corresponding JP Patent Application No. 2021-058956, dated May 21, 2024, along with an English translation thereof.
Office Action issued in Corresponding JP Patent Application No. 2021-058962, dated May 21, 2024, along with an English translation thereof.

* cited by examiner

LIGHT GUIDE PLATE, LIGHT GUIDE PLATE UNIT, AND DISPLAY DEVICE

CROSS REFERENCE TO RELATED APPLICATION

This is a continuation application of PCT International Application No. PCT/JP2022/000017 filed on Jan. 4, 2022, designating the United States of America, which is based on and claims priority of Japanese Patent Application No. 2021-058956 filed on Mar. 31, 2021 and Japanese Patent Application No. 2021-058962 filed on Mar. 31, 2021.

FIELD

The present disclosure relates to a light guide plate, a light guide plate unit, and a display device.

BACKGROUND

An optical device that enables a displayed image to be displayed at a wide angle of view has been disclosed (see Patent Literature (PTL) 1). The optical device includes a plurality of hologram elements in a light guide plate.

CITATION LIST

Patent Literature

PTL 1: Japanese Unexamined Patent Application Publication No. 2020-112746

SUMMARY

However, the optical device in PTL 1 can be improved upon.

In view of this, the present disclosure provides a light guide plate, and so on, capable of improving upon the above related art.

A light guide plate according to an aspect of the present disclosure includes: a first hologram element including two or more diffraction cells; and a second hologram element including a single diffraction cell.

A light guide plate, and so on, according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a schematic diagram illustrating a configuration of a light guide plate according to Embodiment 1.

DESCRIPTION OF EMBODIMENTS (Underlying Knowledge Forming Basis of the Present Disclosure)

There is a display device that projects an image onto a transparent plate such as a windshield of a vehicle (in Japan, generally called a front glass), allowing a user such as a driver to visually check the image together with a view beyond the transparent plate. Such a display device is also generally called a head-up display device.

Figure 1:
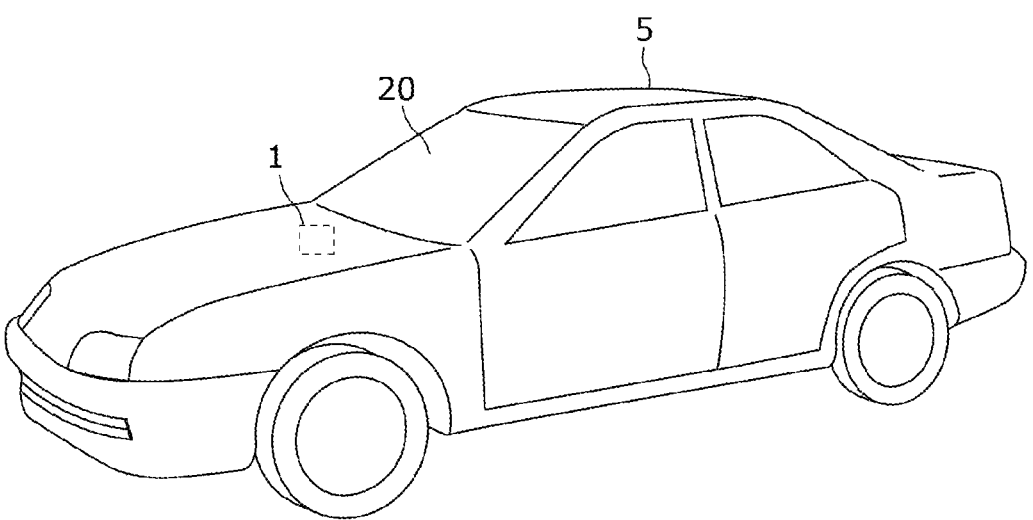
FIG. 1 is a schematic diagram illustrating an example of a vehicle in which a display device according to Embodiment 1 is provided.
Figure 2:
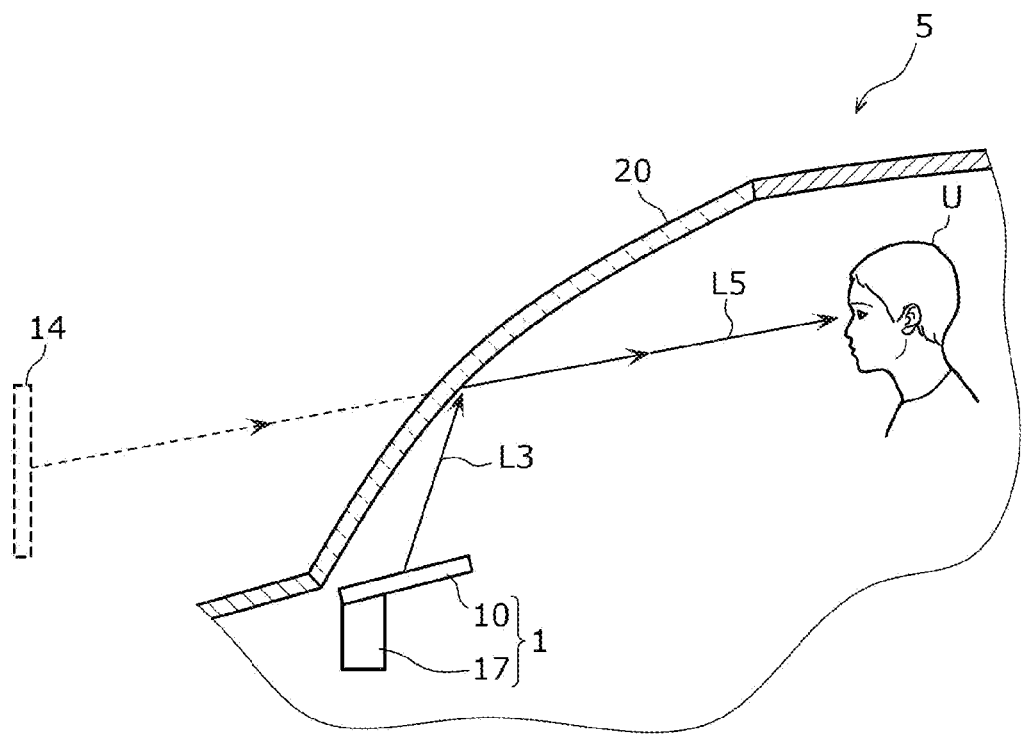
FIG. 2 is a schematic diagram illustrating a configuration of the display device.

FIG. 1 is a schematic diagram illustrating vehicle 5 which is an example of a vehicle in which display device 1 is provided. FIG. 2 is a schematic diagram illustrating a configuration of display device 1.

As illustrated in FIG. 1, vehicle 5 includes display device 1 and windshield 20. Display device 1 is provided, for example, below windshield 20 and emits light for displaying an image (also referred to as display light) upward, that is, toward windshield 20. Display device 1 is provided, for example, in the inside of a dashboard. An optical path of the display light emitted by display device 1 is secured. In other words, the emitted display light reaches windshield 20 without being blocked. A configuration of display device 1 will be described more in detail.

As illustrated in FIG. 2, display device 1 includes light guide plate 10 and image generating device 17.

Image generating device 17 is a device that generates display light and provides the display light to light guide plate 10. For example, image generating device 17 generates the display light by applying, to an image forming element such as liquid crystal, light that is emitted from a light source (not illustrated) included in image generating device 17. Image generating device 17 emits the generated display light toward light guide plate 10.

Light guide plate 10 is a plate body that deflects the display light generated by image generating device 17 while enlarging a beam width of the display light. Here, the beam width means a width of the beam in a direction perpendicular to a traveling direction.

The display light generated by image generating device 17 enters light guide plate 10. The display light entering is guided in the inside of light guide plate 10 and emitted to the outside of light guide plate 10 as light L3. Light L3 is reflected by windshield 20, turns into light L5, and enters the eyes of user U. Light guide plate 10 is provided in such a position and an attitude that light L3 is emitted toward windshield 20.

The enlargement and deflection of the beam width of the display light by light guide plate 10 are performed with a plurality of diffracting elements included in light guide plate 10. Accordingly, the plurality of diffracting elements included in light guide plate 10 each have diffraction properties causing diffraction of the display light in an appropriate direction and each have appropriate dimensions.

With light L5, which is the display light, entering the eyes, user U visually checks an image generated by image generating device 17. User U recognizes the image that is visually checked with light L5 being the display light as virtual image 14 that is positioned beyond windshield 20.

The above-described functions that light guide plate 10 has can be implemented with optical components such as a concave mirror. However, using light guide plate 10 has an advantage of reducing dimensions of display device 1 compared with the implementation with the optical components such as a concave mirror. Since display device 1 is provided in, for example, the inside of a dashboard of vehicle 5, reducing the dimension has an advantage of increasing flexibility of the provision.

However, using light guide plate 10 may deteriorate quality of an image to be displayed. Specifically, in a case where the diffraction properties or the dimensions of the plurality of diffracting elements included in light guide plate 10 are not appropriate, diffracting performance of light guide plate 10 may deteriorate, and as a result, quality of an image to be displayed by display device 1 may deteriorate.

In view of this, the present disclosure has as an object to provide a light guide plate that reduces degradation of quality of an image to be displayed.

Hereinafter, exemplary embodiments will be described in detail with reference to the Drawings.

It should be noted that each of the exemplary embodiments described hereinafter shows a general or specific example. Numerical values, shapes, materials, structural components, the arrangement and connection of the structural components, steps, the processing order of the steps, and so on, are mere examples, and thus are not intended to limit the present disclosure. Furthermore, among the structural components described in the following embodiments, structural components not recited in any one of the independent claims that indicate the broadest concepts are described as optional structural components.

Embodiment 1

A light guide plate and a display device that reduce degradation of quality of an image to be displayed will be described in the present embodiment.

A light guide plate according to an aspect of this embodiment includes: a first hologram element including two or more diffraction cells; and a second hologram element including a single diffraction cell.

According to the above-described aspect, the light guide plate may be able to appropriately deflect entering light and appropriately enlarge a beam width of the light while keeping an influence of a deviation of an optical path of light being guided on a displayed image small with a hologram element including two or more diffraction cells (a first hologram element) and a hologram element including a single diffraction cell (a second hologram element). Accordingly, the light guide plate may be able to reduce deterioration of quality of an image to be displayed.

Furthermore, the first hologram element may include interference fringes having intervals larger than intervals of interference fringes included in the second hologram element.

According to the above-described aspect, since the intervals of interference fringes included in the first hologram element are relatively large, the light guide plate may be able to reduce deterioration of quality of an image resulting from a displacement between sets of interference fringes that occurs at a boundary between diffraction cells included in the first hologram element. This is due to deterioration of quality of an image being evaluated with a ratio of a displacement width between sets of interference fringes to an interval of interference fringes. Thus, the larger the interval of interference fringes of the first hologram element is, the smaller the deterioration of quality of the image is. Accordingly, the light guide plate may be able to further reduce deterioration of quality of an image to be displayed.

Furthermore, in a plan view, an area of the first hologram element may be larger than an area of the second hologram element.

According to the above-described aspect, in the light guide plate, an area of the first hologram element is relatively large in a plan view of the first hologram element. Thus, diffraction by the first hologram element may be able to make a beam width of light being guided larger. In addition, since a beam width of light emitted from the light guide plate is large, it may be possible to allow a user to visually check a larger displayed image. Accordingly, the light guide plate may be able to reduce deterioration of quality of an image to be displayed while allowing a larger displayed image to be visually checked.

Furthermore, in a plan view, interference fringes included in the two or more diffraction cells included in the first hologram element may be curved.

According to the above-described aspect, since the interference fringes are curved in a plan view of the first hologram element of the light guide plate, a beam shape of light that is guided (i.e., a cross-sectional shape of a beam perpendicular to a traveling direction of the light) may be warped. A beam shape of light emitted from the light guide plate may be warped based on a surface shape of a windshield when the light is reflected by the windshield. Thus, by causing curved interference fringes of the first hologram element to produce warpage that cancels warpage of the beam shape produced by the reflection by the windshield, it may be possible to reduce a warpage of a displayed image. This is based on the first hologram element including two or more diffraction cells, enabling the first hologram element to be easily formed with interference fringes having various patterns. Accordingly, the light guide plate may be able to further reduce deterioration of quality of an image to be displayed.

Furthermore, in a plan view, interference fringes included in the single diffraction cell included in the second hologram element may be straight.

According to the above-described aspect, since the interference fringes are straight in a plan view of the second hologram element of the light guide plate, it may be possible to guide light without warping the beam shape of the light that is guided. Accordingly, the light guide plate may be able to further reduce deterioration of quality of an image to be displayed.

Furthermore, the first hologram element may be a relief-type hologram element.

According to the above-described aspect, the first holo-gram element of the light guide plate may possibly be more easily implemented by a relief-type hologram element.

Furthermore, the second hologram element may be a volume-type hologram element.

According to the above-described aspect, the second hologram element of the light guide plate may possibly be more easily implemented by a volume-type hologram ele-ment.

Furthermore, the first hologram element may be posi-tioned to cause light that has propagated in an inside of the light guide plate to be emitted to an outside of the light guide plate by deflection through diffraction.

According to the above-described aspect, the first holo-gram element of the light guide plate may be able to cause the light that has propagated in the inside of the light guide plate to be emitted to the outside of the light guide plate by deflection through diffraction.

Therefore, the light guide plate may be able to emit the light to the outside of the light guide plate by way of the diffraction by the first hologram element.

Furthermore, the second hologram element may be posi-tioned to cause light that has entered from an outside to an inside of the light guide plate to propagate in the inside of the light guide plate by deflection through diffraction.

According to the above-described aspect, the second hologram element of the light guide plate may be able to cause the light that has entered from the outside to the inside of the light guide plate to propagate in the inside of the light guide plate by deflection through diffraction. Therefore, the light guide plate may be able to cause light to propagate in the inside of the light guide plate by way of the diffraction by the second hologram element.

Furthermore, the first hologram element may be an emis-sion-side hologram element, and the second hologram ele-ment may comprise two second hologram elements which are an entrance-side hologram element and a deflecting hologram element. Here, the entrance-side hologram ele-ment may be positioned to cause light that has entered from an outside to an inside of the light guide plate to propagate in the inside of the light guide plate by deflection through diffraction, the deflecting hologram element may be posi-tioned to cause the light deflected by the entrance-side hologram element to propagate in the inside of the light guide plate by deflection through diffraction, and the emis-sion-side hologram element may be positioned to cause the light deflected by the deflecting hologram element to be emitted to the outside of the light guide plate by deflection through diffraction.

According to the above-described aspect, the light guide plate may be able to more appropriately reduce deterioration of quality of an image to be displayed, by using one first hologram element as an emission-side hologram element and using two second hologram elements as an entrance-side hologram element and a deflecting hologram element.

Furthermore, a display device according to an aspect of the present embodiment is a display device that includes: the above-described light guide plate; and an image generating device that generates light showing an image, and causes the light to enter the light guide plate.

According to this aspect, it may be possible to reduce deterioration of quality of an image to be displayed, by using the light guide plate.

Hereinafter, embodiments will be described in detail with reference to the Drawings.

Note that each of the embodiments described below shows a specific example of the present disclosure. The numerical values, shapes, materials, structural components, the arrangement and connection of the structural compo-nents, steps, the processing order of the steps, etc., shown in the following embodiments are mere examples, and thus are not intended to limit the present disclosure. Furthermore, among the structural components described in the following embodiments, structural components not recited in any one of the independent claims that indicate the broadest concepts are described as optional structural components.

A light guide plate and a display device in the present embodiment form a display device that displays an image on a windshield of a vehicle by projecting the image onto the windshield. Hereinafter, the description may be made with XYZ axes illustrated in figures.

Figure 3:
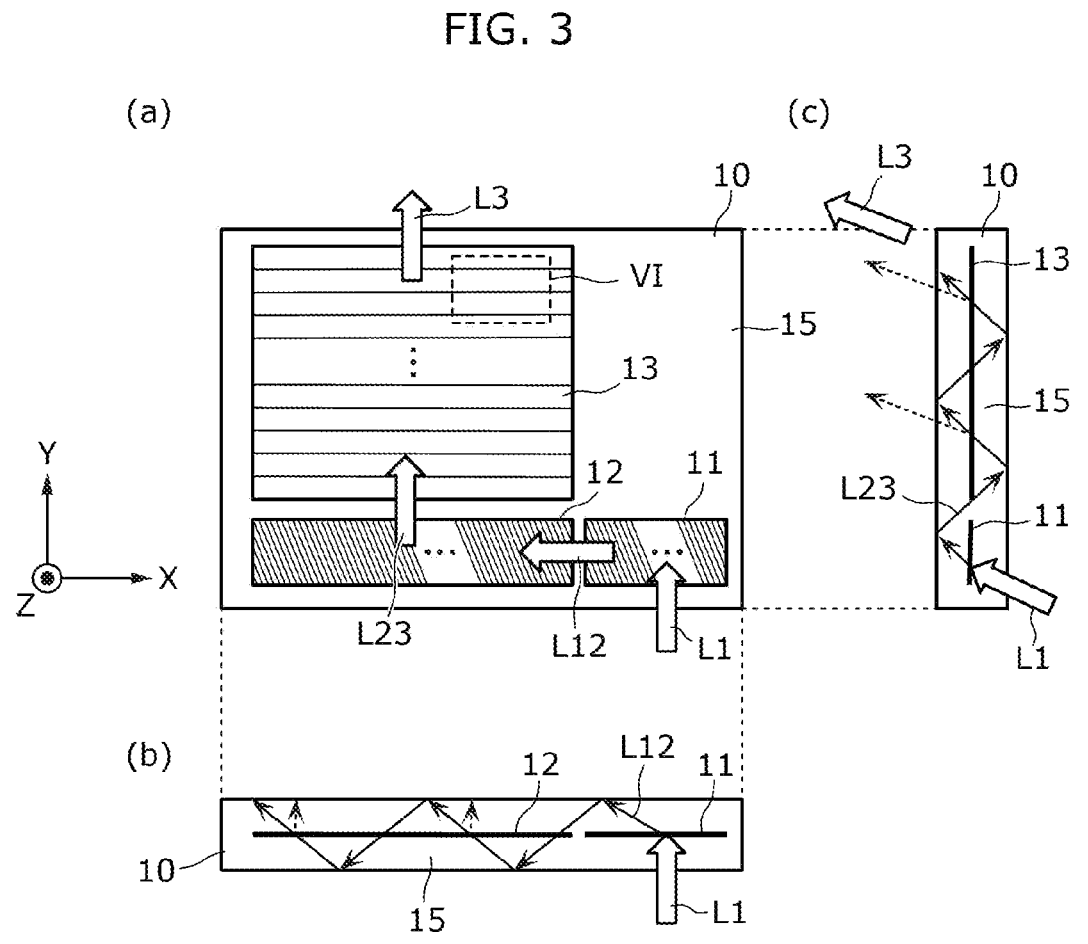

FIG. 3 is a schematic diagram illustrating a configuration of light guide plate 10 according to the present embodiment. In FIG. 3, (a) is a diagram illustrating a configuration of light guide plate 10 in a plan view, that is, as viewed from a Z-axis positive direction. In FIG. 3, (b) is a diagram illustrating a configuration of light guide plate 10 in a side view, that is, as viewed from a Y-axis negative direction. In FIG. 3, (c) is a diagram illustrating a configuration of light guide plate 10 in a side view, that is, as viewed from an X-axis positive direction.

As illustrated in FIG. 3, light guide plate 10 includes transparent component 15 and includes, in the inside of transparent component 15, hologram elements 11, 12, and 13 (also referred to as hologram element 11 and the like). Light guide plate 10 guides, in the inside of light guide plate 10 by total reflection, light L1 that has entered. Light guide plate 10 emits, to the outside of light guide plate 10, light that is subjected to deflection through diffraction by holo-gram elements 11, 12, and 13 as light L3. Transparent component 15 is made of glass, resin, or the like.

Light L1 that enters light guide plate 10 is light that travels in a Y-axis positive direction and the Z-axis positive direction. Light L1 is assumed to be display light generated by image generating device 17. In a state of using display device 1 (i.e., in a state where display device 1 is provided as illustrated in FIG. 2), light guide plate 10 is provided in such a position and an attitude that light L1 enters at an appropriate angle illustrated in FIG. 3.

Hologram element 11 is a diffracting element that is disposed inside light guide plate 10. Hologram element 11 causes light L1 entering the inside of light guide plate 10 from the outside of light guide plate 10 to propagate in the inside of light guide plate 10 by deflection through diffrac-tion. Hologram element 11 is formed with interference fringes that are straight in a plan view and causes diffraction with the interference fringes to deflect light L1, thus forming light L12. Light L12 is light that travels in an X-axis negative direction. Light L12 propagates in the inside of light guide plate 10 in the X-axis negative direction, repeat-ing total reflection at interfaces between transparent com-ponent 15 and the air.

The interference fringes formed on hologram element 11 are interference fringes that deflect light L1 in such a manner that light L12 undergoes the total reflection at the interfaces between transparent component 15 and the air. Specifically, the interference fringes deflect light L1 in such a manner as to maintain a state where an angle of incidence of light L12 with respect to the interface is larger than a critical angle.

Hologram element 12 is a diffracting element that is disposed inside light guide plate 10. Hologram element 12 causes light L12 deflected by hologram element 11 to propagate in the inside of light guide plate 10 by deflection through diffraction. Hologram element 12 is formed with interference fringes that are straight in a plan view and causes diffraction with the interference fringes to deflect light L12, thus forming light L23. Light L23 is light that travels in the Y-axis positive direction. Light L23 propagates in the inside of light guide plate 10 in the Y-axis positive direction, repeating total reflection at interfaces between transparent component 15 and the air.

The interference fringes formed on hologram element 12 are interference fringes that deflect light L12 in such a manner that light L23 undergoes the total reflection at the interfaces between transparent component 15 and the air. Specifically, the interference fringes deflect light L12 in such a manner as to maintain a state where an angle of incidence of light L23 with respect to the interface is larger than a critical angle.

Hologram element 13 is a diffracting element that is disposed inside light guide plate 10. Hologram element 13 causes light L23 deflected by hologram element 12 to be emitted to the outside of light guide plate 10 by deflection through diffraction. Hologram element 13 is formed with interference fringes that are straight in a plan view and causes diffraction with the interference fringes to deflect light L23, thus forming light L3. Light L3 is light that travels in the Y-axis positive direction and the Z-axis positive direction.

The interference fringes formed on hologram element 13 are interference fringes that deflect light L23 in such a manner that light L3 is emitted from light guide plate 10 rather than undergoing total reflection at the interfaces between transparent component 15 and the air. Specifically, the interference fringes deflect light L23 in such a manner as to maintain a state where an angle of incidence of light L3 with respect to the interface is larger than a critical angle.

Note that the interference fringes included in hologram element 13 may be curved in a plan view (see a variation described later).

Hologram element 11 will be also referred to as an entrance-side hologram element. Hologram element 12 will be also referred to as a deflecting hologram element. Hologram element 13 will be also referred to as an emission-side hologram element.

In the state of using display device 1, light guide plate 10 is provided in such a position and an attitude that light L3 is emitted toward windshield 20. After being emitted from light guide plate 10, light L3 is reflected by windshield 20 and enters the eyes of user U.

Features of diffraction cells included in hologram element 11 and the like will be described. A diffraction cell is a region where diffraction properties are the same. In one diffraction cell, interference fringes having a predetermined pattern are formed. With formed interference fringes, Hologram element 11 and the like diffract light. Hologram element 11 and the like may have a single diffraction cell or may have two or more diffraction cells. In the case where hologram element 11 and the like have a plurality of diffraction cells, a displacement between patterns of interference fringes may occur at a boundary between adjacent diffraction cells. The displacement between the patterns of interference fringes causes a deviation of an optical path of diffracted light, resulting in degradation of an image to be displayed by the light (also referred to as a displayed image).

First, hologram element 11 and the like has following features about the number of diffraction cells included in hologram element 11 and the like.

That is, hologram element 11 is a hologram element including a single diffraction cell (corresponding to the second hologram element). Hologram element 12 is a hologram element including a single diffraction cell (corresponding to the second hologram element). Hologram element 13 is a hologram element including two or more diffraction cells (corresponding to the first hologram element).

Accordingly, light guide plate 10 can appropriately deflect light being guided to appropriately enlarge a beam width of the light being guided while reducing an influence of a deviation of an optical path of the light being guided on a displayed image.

Hologram element 11 and the like may have following features about intervals of interference fringes.

That is, hologram element 11 and the like may have such a feature that hologram element 13 includes interference fringes having intervals larger than intervals of interference fringes included in hologram element 11. Hologram element 11 and the like may have such a feature that hologram element 13 includes interference fringes having intervals larger than intervals of interference fringes included in hologram element 12.

By making the intervals of the interference fringes included in hologram element 13 larger than the intervals of the interference fringes included in hologram element 11 or 12, angles of diffraction by hologram elements 11 and 12 (each being an angle formed by traveling directions of light before and after the diffraction) can be made larger than an angle of diffraction by hologram element 13. Accordingly, light guide plate 10 can appropriately guide light on an optical path illustrated in FIG. 3.

Hologram element 11 and the like may have following features about their areas in a plan view (when viewed from a Z-axis positive side).

That is, hologram element 11 and the like may have such a feature that an area of hologram element 13 is larger than an area of hologram element 11 in a plan view. Hologram element 11 and the like may have such a feature that the area of hologram element 13 is larger than an area of hologram element 12 in a plan view.

Accordingly, a beam width of light emitted by hologram element 13 can be made larger, which makes dimensions of the displayed image larger, allowing user U to visually check the larger displayed image.

Hologram element 11 and the like may have following features about their types.

That is, hologram element 11 and the like may have such a feature that hologram element 11 or 12 is a relief-type hologram element. Accordingly, hologram element 11 or 12 can be molded with a mold. This can contribute to realization of mass production.

Hologram element 11 and the like may have such a feature that hologram element 13 is a volume-type hologram element. Accordingly, hologram element 13 can be made large or to have a large area.

A method of creating a hologram element and a feature of a diffraction cell included in a created hologram element will be described below. Examples of the method of creating a hologram element include (1) a method involving batch exposure and (2) a method involving step-and-repeat exposure.

(1) Method Involving Batch Exposure

Figure 4:
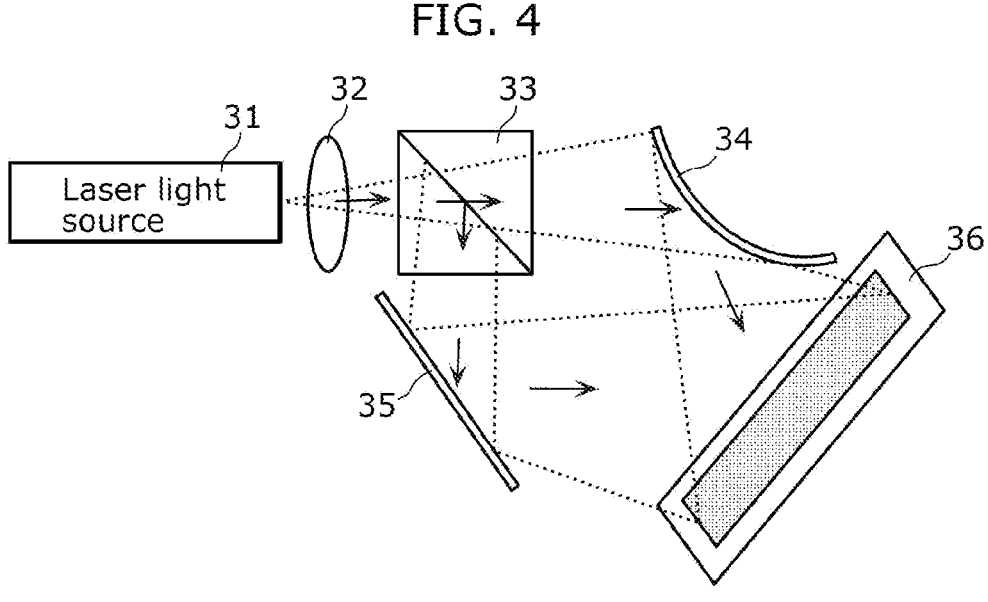
FIG. 4 is a diagram for describing a first example of a method of creating a hologram element according to Embodiment 1.

FIG. 4 is a diagram for describing a first example of a method of creating a hologram element according to the present embodiment. The method illustrated in FIG. 4 is an example of the method involving batch exposure.

In the method involving batch exposure, light emitted from laser light source 31 reaches polarizing beam splitter 33 via lens 32. The light that is transmitted by polarizing beam splitter 33 is reflected by curved mirror 34 to reach photo-sensitive member 36. The light that is reflected by polarizing beam splitter 33 is reflected by planar mirror 35 to reach photo-sensitive member 36. Photo-sensitive member 36 records interference fringes that are produced by interference between the light reflected by curved mirror 34 and the light reflected by planar mirror 35. Photo-sensitive member 36 recording the interference fringes in this manner is created as a hologram element.

In the method involving batch exposure, light is applied to the entire surface of photo-sensitive member 36 by one-time emission of light by laser light source 31. Thus, a single diffraction cell is formed on the entire surface of photo-sensitive member 36. Therefore, a hologram element created by the method involving batch exposure includes a single diffraction cell. The method involving batch exposure has such a feature that a displacement between sets of interference fringes at a boundary between diffraction cells (described later), which can occur in a case where step-and-repeat exposure is used, does not occur.

In the method involving batch exposure, an intensity of the applied light decreases at a position farther from a central portion of photo-sensitive member 36. Thus, dimensions of a creatable hologram element are limited to a predetermined size.

Therefore, the method involving batch exposure is suitable for creating a hologram element that is relatively small in dimensions and includes a single diffraction cell.

(2) Method Involving Step-And-Repeat Exposure

Figure 5:
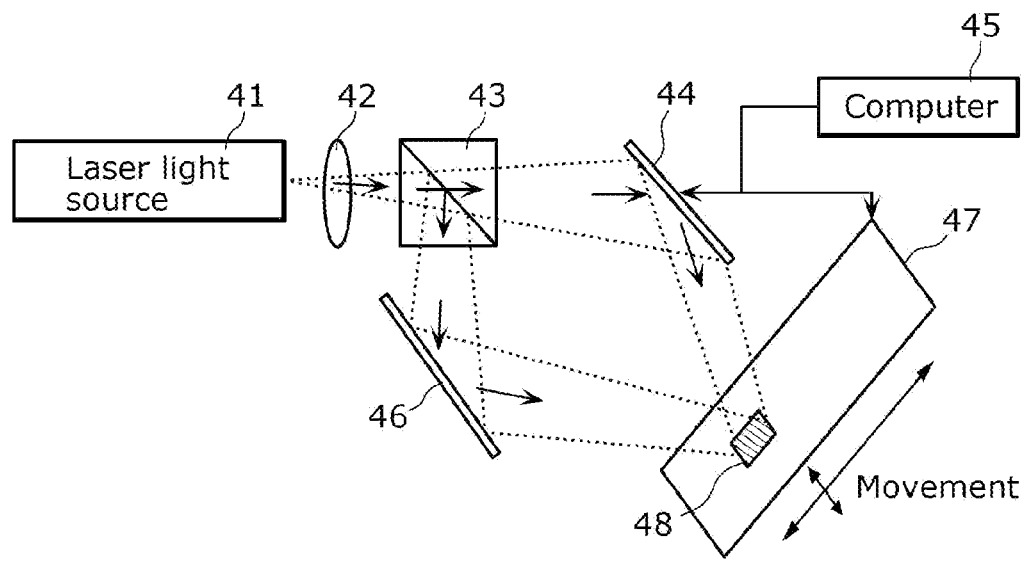
FIG. 5 is a diagram for describing a second example of a method of creating a hologram element according to Embodiment 1.

FIG. 5 is a diagram for describing a second example of a method of creating a hologram element according to the present embodiment. The method illustrated in FIG. 5 is an example of the method involving step-and-repeat exposure.

In the method involving step-and-repeat exposure, a plurality of regions into which photo-sensitive member 47 is divided are each formed with interference fringes one by one. On one target region 48 selected from among the plurality of regions, interference fringes are formed by one-time emission of light. On the entire surface of photo-sensitive member 47, target regions 48 are selected and formed with interference fringes one by one. As a result, the entire surface of photo-sensitive member 47 is formed with interference fringes.

Computer 45 selects one target region 48 from among the plurality of regions included in photo-sensitive member 47. Computer 45 forms an image indicating a pattern of interference fringes to be formed on target region 48 selected on a liquid crystal on silicon (LCOS) element 44, which is a reflective liquid crystal element. Computer 45 also performs parallel movement on photo-sensitive member 47 such that light reflected by LCOS element 44 and light reflected by planar mirror 46 are applied to target region 48.

Light emitted from laser light source 41 reaches polarizing beam splitter 43 via lens 42. The light that is transmitted by polarizing beam splitter 43 is reflected by LCOS element 44 to reach target region 48 of photo-sensitive member 47. LCOS element 44 is formed with the image indicating the pattern of interference fringes to be formed on target region 48, by computer 45. The light that is reflected by LCOS element 44 includes the image indicating the pattern of interference fringes. The light that is reflected by polarizing beam splitter 43 is reflected by planar mirror 46 to reach target region 48 of photo-sensitive member 47.

In target region 48, interference fringes that are produced by interference between the light reflected by LCOS element 44 and the light reflected by planar mirror 46 are recorded. By performing the process of recording interference fringes in one target region 48 on all of the plurality of regions of photo-sensitive member 47 one by one, a plurality of diffraction cells are formed on the entire surface of photo-sensitive member 47. Photo-sensitive member 47 recording the interference fringes in this manner is created as a hologram element.

In the method involving step-and-repeat exposure, a region that is exposed to the light by one-time emission of light is relatively small. Thus, an intensity of the light applied is substantially equal at every position in the region exposed. Therefore, the method involving step-and-repeat exposure is free from limitation on dimensions of a creatable hologram element and is suitable for creating a hologram element that is relatively large in dimensions.

In the method involving step-and-repeat exposure, interference fringes having a pattern based on an image that is formed on LCOS element 44 by computer 45 are formed. Therefore, the method involving step-and-repeat exposure has such a feature of providing a high flexibility to the pattern of the interference fringes.

In the method involving step-and-repeat exposure, the plurality of diffraction cells are formed on the entire surface of photo-sensitive member 47. Thus, a displacement between sets of interference fringes occurs at a boundary between the diffraction cells. The displacement between sets of interference fringes causes a deviation of an optical path of diffracted light, resulting in degradation of a displayed image based on the light.

The displacement between sets of interference fringes between diffraction cells will be described below.

Figure 6:
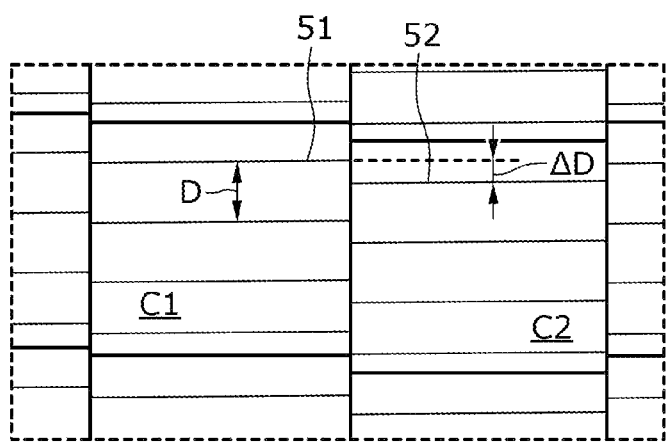
FIG. 6 is a diagram for describing diffraction cells according to Embodiment 1.

FIG. 6 is a diagram for describing diffraction cells according to the present embodiment. The diffraction cells illustrated in FIG. 6 are those in a dashed box VI in FIG. 3 illustrated in an enlarged manner.

FIG. 6 illustrates a hologram element including a plurality of diffraction cells that include two diffraction cells C1 and C2. The plurality of diffraction cells C1 and C2 are diffraction cells that are formed by, for example, the step-and-repeat exposure.

Diffraction cells C1 and C2 are each in a rectangular shape. However, the shape of the diffraction cells is not limited to this.

As illustrated in FIG. 6, line 51, which is one of lines constituting interference fringes of diffraction cell C1, and line 52, which is one of lines constituting interference fringes of diffraction cell C2 are substantially parallel to each other but is not on the same straight line. In other words, line 51 and line 52 make a deviation of width ΔD.

The displacement between sets of interference fringes is not caused by a design based on an intention to form such interference fringes. The displacement is caused unintentionally by minute misalignment in devices in creating a hologram element.

A size of the displacement between sets of interference fringes is evaluated with a ratio of width ΔD to interval D of interference fringes. Specifically, the larger evaluation index E shown by (Equation 1) below is, the larger the displacement between sets of interference fringes is, and the larger the degradation of a displayed image that can be produced as a result of the displacement is.

$$\text{Evaluation index } E = \Delta D / D \qquad \text{(Equation 1)}$$

Therefore, for a plurality of hologram elements having the same interval D of interference fringes, the larger width ΔD is, the larger evaluation index E is. In a case where widths ΔD between a plurality of hologram elements are the same, the larger interval D of interference fringes is, the smaller evaluation index E is.

For hologram element 11 and the like included in display device 1, since intervals D of the interference fringes of hologram element 13 is larger than intervals D of the interference fringes of hologram element 11 or 12. Thus, a contribution of a displacement between sets of interference fringes in hologram element 13 to evaluation index E is small. That is, an influence of the displacement on degradation of an image is kept small.

From the above, for hologram element 11 and the like included in display device 1, hologram elements 11 and 12 are suitably created by the method involving batch exposure. In other words, hologram elements 11 and 12 can be created by the method involving batch exposure.

A first reason for this is that hologram elements 11 and 12 each have dimensions smaller than the dimensions of hologram element 13.

A second reason for this is that if hologram elements 11 and 12 are created by the method involving step-and-repeat exposure, a displacement between sets of interference fringes between diffraction cells has a significant influence on degradation of a displayed image. This is caused by intervals D of hologram elements 11 and 12 being relatively small, which increases evaluation index E of a displacement between sets of interference fringes between diffraction cells.

Hologram element 13 can be considered to be suitable for being created by the method involving step-and-repeat exposure. In other words, hologram element 13 can be created by the method involving step-and-repeat exposure.

A first reason for this is that hologram element 13 has dimensions larger than the dimensions of hologram elements 11 and 12.

A second reason for this is that the intervals of the interference fringes of hologram element 13 are larger than the intervals of the interference fringes of hologram elements 11 and 12.

Thus, an influence of a displacement between sets of interference fringes between adjacent diffraction cells on degradation of a displayed image is kept small.

Variation of Embodiment 1

In the present variation, another example of the shape of the interference fringes included in hologram element 13 will be described.

Specifically, as an example in which interference fringes included in two or more diffraction cells included in hologram element 13 in the embodiment described above are curved in a plan view, hologram element 113 will be described.

Figure 7:
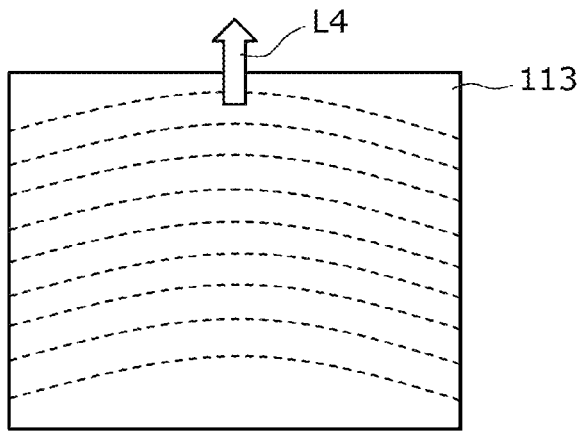
FIG. 7 is a schematic diagram illustrating a hologram element according to a variation of Embodiment 1.

FIG. 7 is a schematic diagram illustrating hologram element 113 according to the variation. As illustrated in FIG. 7, interference fringes included in diffraction cells included in hologram element 113 are curved in a plan view.

Light L4 that is diffracted by the curved interference fringes included in hologram element 113 has a beam shape that is warped by the diffraction. Light L4 diffracted in this manner travels toward windshield 20. At the same time, a surface of windshield 20 is generally a curved surface rather than a flat surface. Therefore, the beam shape is warped again when light L4 is reflected.

Thus, by forming the interference fringes included in hologram element 113 into interference fringes that warp the beam shape in such a manner as to cancel the warpage produced at the time of the reflection by windshield 20, warpage of a displayed image can be reduced.

Note that in the case where the interference fringes included in hologram element 113 are curved, shapes of the interference fringes included in hologram elements 11 and 12 need not be curved. Therefore, the interference fringes included in the single diffraction cell included in hologram element 11 or 12 may be straight. This is because hologram element 113 producing a warpage that cancels the warpage of the beam shape produced by windshield 20 dispenses with the need of canceling the warpage by the interference fringes included in hologram elements 11 and 12.

As described above, the light guide plate in Embodiment 1 or the variation may be able to appropriately deflect entering light and appropriately enlarge a beam width of the light while keeping an influence of a deviation of an optical path of light being guided on a displayed image small with a hologram element including two or more diffraction cells (the first hologram element) and a hologram element including a single diffraction cell (the second hologram element). Accordingly, the light guide plate may be able to reduce deterioration of quality of an image to be displayed.

Since the intervals of interference fringes included in the first hologram element are relatively large, the light guide plate may be able to reduce deterioration of quality of an image resulting from a displacement between sets of interference fringes that occurs at a boundary between diffraction cells included in the first hologram element. This is due to deterioration of quality of an image being evaluated with a ratio of a displacement width between sets of interference fringes to an interval of interference fringes. Thus, the larger the interval of interference fringes of the first hologram element is, the smaller the deterioration of quality of the image is. Accordingly, the light guide plate may be able to further reduce deterioration of quality of an image to be displayed.

In the light guide plate, an area of the first hologram element is relatively large in a plan view of the first hologram element. Thus, diffraction by the first hologram element may be able to make a beam width of light being guided larger. In addition, since a beam width of light emitted from the light guide plate is large, it may be possible to allow a user to visually check a larger displayed image. Accordingly, the light guide plate may be able to reduce deterioration of quality of an image to be displayed while allowing a larger displayed image to be visually checked.

Since the interference fringes are curved in a plan view of the first hologram element of the light guide plate, a beam shape of light that is guided may be warped. A beam shape of light emitted from the light guide plate may be warped based on a surface shape of a windshield when the light is reflected by the windshield. Thus, by causing curved interference fringes of the first hologram element to produce warpage that cancels warpage of the beam shape produced by the reflection by the windshield, it may be possible to reduce a warpage of a displayed image. This is based on the first hologram element including two or more diffraction cells, enabling the first hologram element to be easily formed with interference fringes having various patterns. Accordingly, the light guide plate may be able to further reduce deterioration of quality of an image to be displayed.

Since the interference fringes are straight in a plan view of the second hologram element of the light guide plate, it may be possible to guide light without warping the beam shape of the light that is guided. Accordingly, the light guide plate may be able to further reduce deterioration of quality of an image to be displayed.

The first hologram element of the light guide plate may possibly be more easily implemented by a relief-type hologram element.

The second hologram element of the light guide plate may possibly be more easily implemented by a volume-type hologram element.

The first hologram element of the light guide plate may be able to cause the light that has propagated in the inside of the light guide plate to be emitted to the outside of the light guide plate by deflection through diffraction. Therefore, the light guide plate may be able to emit the light to the outside of the light guide plate by way of the diffraction by the first hologram element.

The second hologram element of the light guide plate may be able to cause the light that has entered from the outside to the inside of the light guide plate to propagate in the inside of the light guide plate by deflection through diffraction. Therefore, the light guide plate may be able to cause light to propagate in the inside of the light guide plate by way of the diffraction by the second hologram element.

The light guide plate may be able to more appropriately reduce deterioration of quality of an image to be displayed, by using one first hologram element as an emission-side hologram element and using two second hologram elements as an entrance-side hologram element and a deflecting hologram element.

Embodiment 2

Another embodiment of the light guide plate and the display device that reduce deterioration of quality of an image to be displayed will be described in the present embodiment.

First, deterioration of quality of a displayed image due to decrease in intensity of light or occurrence of stray light will be described in detail. A light guide plate that causes such deterioration of quality of a displayed image will be referred to as light guide plate 90.

Figure 8:
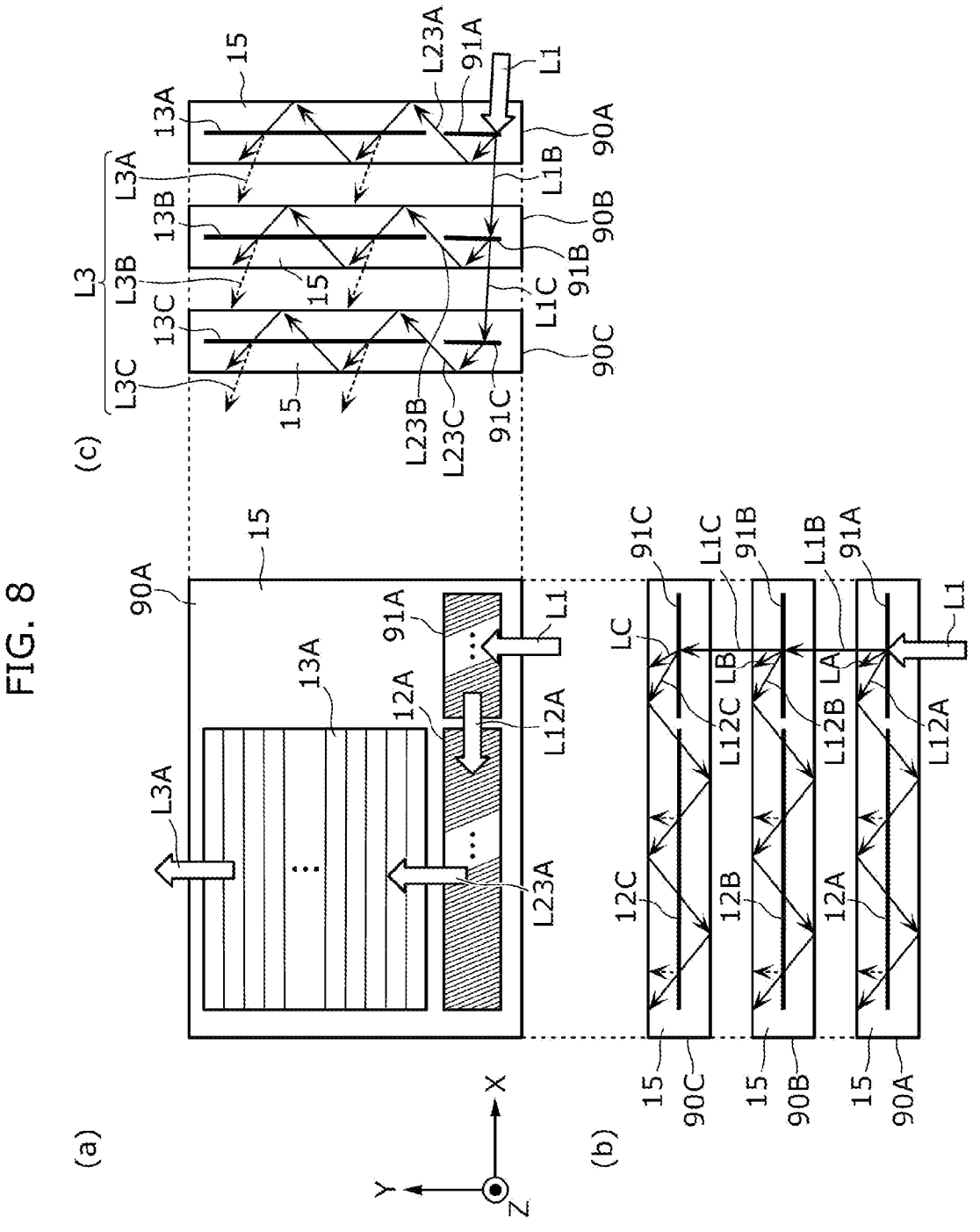
FIG. 8 is a schematic diagram illustrating a configuration of a light guide plate according to related art related to Embodiment 2.

FIG. 8 is a schematic diagram illustrating a configuration of light guide plate 90 according to related art. In FIG. 8, (a) is a diagram illustrating a configuration of light guide plate 90 in a plan view, that is, as viewed from the Z-axis positive direction. In FIG. 8, (b) is a diagram illustrating a configuration of light guide plate 90 in a side view, that is, as viewed from the Y-axis negative direction. In FIG. 8, (c) is a diagram illustrating a configuration of light guide plate 90 in a side view, that is, as viewed from the X-axis positive direction.

As illustrated in (b) and (c) of FIG. 8, light guide plate 90 includes light guide bodies 90A, 90B, and 90C (also referred to as light guide body 90A and the like). Light guide body 90A and the like are disposed in an attitude in which they are parallel to one another. Light guide body 90A and the like are disposed at positions at which they are superposed on one another in a plan view. Light guide body 90A and the like are in the same shape, for example, but not limited to, the same rectangular shape, in a plan view.

In FIG. 8, (a) illustrates only light guide body 90A out of light guide body 90A and the like described above. The same description about (a) in FIG. 8 applies to light guide bodies 90B and 90C.

As illustrated in FIG. 8, light guide body 90A is a plate body that includes transparent component 15 and includes, in the inside or on a surface of transparent component 15, hologram elements 91A, 12A, and 13A (also referred to as hologram element 91A and the like). Light guide body 90A guides, in the inside of light guide body 90A by total reflection, light L1 that has entered. Light guide body 90A emits, to the outside of light guide body 90A, light that is subjected to deflection through diffraction by hologram element 91A and the like as light L3A. Transparent component 15 is made of glass, acrylic resin, or the like.

Light L1 that enters light guide body 90A is light that travels in the Y-axis positive direction and the Z-axis positive direction. Light L1 is assumed to be display light generated by image generating device 17. In this case, light L1 includes light of a plurality of wavelength components (e.g., light of red, green, and blue wavelength components). In the state of using display device 1 (i.e., in the state where display device 1 is provided as illustrated in FIG. 2), light guide body 90A is provided in such a position and an attitude that light L1 enters at an appropriate angle illustrated in FIG. 8.

Hologram element 91A is a diffracting element that is disposed in the inside or on a surface of light guide body 90A. Hologram element 91A causes light L1 entering the inside of light guide body 90A from the outside of light guide body 90A to propagate in the inside of light guide body 90A by deflection through diffraction. Hologram element 91A is formed with interference fringes that are straight in a plan view and causes diffraction with the interference fringes to deflect light L1, thus forming light L12A and LA. Light L12A is light that travels in the X-axis negative direction. Light L12A is light of a specific frequency component (e.g., light of a frequency component corresponding to red). Light L12A propagates in the inside of light guide body 90A in the X-axis negative direction, repeating total reflection at interfaces between transparent component 15 and the air.

The interference fringes formed on hologram element 91A are interference fringes that deflect light L1 in such a manner that light L12A undergoes the total reflection at the interfaces between transparent component 15 and the air. Specifically, the interference fringes deflect light L1 in such a manner as to maintain a state where an angle of incidence of light L12A with respect to the interface is larger than a critical angle.

Light LA is light that travels in the X-axis negative direction. Light LA is light of frequency components other than the specific frequency component (e.g., light of frequency components corresponding to blue and green). Light LA is light that is produced when light L1 is diffracted by hologram element 91A, resulting from the fact that an angle of diffraction varies with frequency. When being diffracted by the interference fringes, light LA may or may not undergo total reflection at the interface between transparent component 15 and the air, to produce stray light.

Hologram element 12A is a diffracting element that is disposed in the inside or on a surface of light guide body 90A. Hologram element 12A causes light L12A deflected by hologram element 91A to propagate in the inside of light guide body 90A by deflection through diffraction. Hologram element 12A is formed with interference fringes that are straight in a plan view and causes diffraction with the interference fringes to deflect light L12A, thus forming light L23A. Light L23A is light that travels in the Y-axis positive direction. Light L23A propagates in the inside of light guide body 90A in the Y-axis positive direction, repeating total reflection at interfaces between transparent component 15 and the air.

The interference fringes formed on hologram element 12A are interference fringes that deflect light L12A in such a manner that light L23A undergoes the total reflection at the interfaces between transparent component 15 and the air.

Specifically, the interference fringes deflect light L12A in such a manner as to maintain a state where an angle of incidence of light L23A with respect to the interface is larger than a critical angle.

Hologram element 13A is a diffracting element that is disposed in the inside or on a surface of light guide body 90A. Hologram element 13A causes light L23A deflected by hologram element 12A to be emitted to the outside of light guide body 90A by deflection through diffraction. Hologram element 13A is formed with interference fringes that are straight in a plan view and causes diffraction with the interference fringes to deflect light L23A, thus forming light L3A. Light L3A is light that travels in the Y-axis positive direction and the Z-axis positive direction.

The interference fringes formed on hologram element 13A are interference fringes that deflect light L23A in such a manner that light L3A is emitted from light guide body 90A rather than undergoing total reflection at the interfaces between transparent component 15 and the air. Specifically, the interference fringes deflect light L23A in such a manner as to maintain a state where an angle of incidence of light L3A with respect to the interface is larger than a critical angle.

In the state of using display device 1, light guide body 90A is provided in such a position and an attitude that light L3A is emitted toward windshield 20.

Light guide body 90B is the same as light guide body 90A. Light L1B that is transmitted by hologram element 91A enters light guide body 90B. Light guide body 90B deflects light L1B entering, causes hologram elements 91B, 12B, and 13B to diffract light of its specific frequency component (e.g., light of a frequency component corresponding to green) one by one, and emits light L3B. At this time, light guide body 90B produces light LB, which is stray light.

Light guide body 90C is the same as light guide body 90A. Light L1C that is transmitted by hologram element 91B enters light guide body 90C. Light guide body 90C deflects light L1C entering, causes hologram elements 91C, 12C, and 13C to diffract light of its specific frequency component (e.g., light of a frequency component corresponding to blue) one by one, and emits light L3C. At this time, light guide body 90C produces light LC, which is stray light.

Beams of light L3A, L3B, and L3C form light L3 and emitted from light guide plate 90. After being emitted from light guide plate 90, light L3 is reflected by windshield 20 and enters the eyes of user U.

Here, since light L1B is light that is diffracted by hologram element 91A, an intensity of light L1B is lower than an intensity of light L1. Since light L1C is light that is diffracted by hologram elements 91A and 91B, an intensity of light L1C is lower than the intensity of light L1. Therefore, an intensity of light L3 is decreased to be lower than the intensity of light L1. Further, when light L1 is diffracted by hologram elements 91A and 91B, beams of light LA, LB, and LC, which are beams of stray light, are produced.

In this manner, when light guide plate 90 diffracts light L1 entering, the decrease in intensity of the light and the production of the stray light cause deterioration of quality of a displayed image.

In view of this, the present embodiment has as an object to provide a light guide plate, and so on, that reduces deterioration of quality of an image to be displayed.

Hereinafter, embodiments will be described in detail with reference to the Drawings.

Note that each of the embodiments described below shows a specific example of the present disclosure. The numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims that indicate the broadest concepts are described as optional structural components.

A light guide plate unit according to an aspect of this embodiment includes: a first light guide plate; a second light guide plate; a first deflecting element that causes light of a first wavelength component included in incoming light to enter the first light guide plate, by selectively deflecting the light of the first wavelength component; and a second deflecting element that causes light of a second wavelength component included in the incoming light to enter the second light guide plate, by selectively deflecting the light of the second wavelength component. The first light guide plate is, for example, the light guide plate described in Embodiment 1. The second light guide plate is, for example, the light guide plate described in Embodiment 1.

According to the above-described aspect, the light guide plate unit causes beams of light of two wavelength components included in incoming light to enter two light guide plates by selectively deflecting the beams of light with deflecting elements. Thus, it may be possible to reduce the decrease in intensity of light and the production of stray light. In this manner, the light guide plate unit may be able to reduce deterioration of quality of an image to be displayed.

Furthermore, the first deflecting element may cause the light of the first wavelength component included in the incoming light to enter the first light guide plate by selectively reflecting the light of the first wavelength component and transmitting light of a wavelength component other than the first wavelength component included in the incoming light; and the second deflecting element may cause the light of the second wavelength component included in the incoming light to enter the second light guide plate by selectively reflecting the light of the second wavelength component and transmitting light of a wavelength component other than the second wavelength component included in the incoming light.

According to the above-described aspect, the light guide plate unit causes beams of light of two wavelength components included in incoming light to enter two light guide plates by utilizing the deflection by the deflecting elements. Thus, it may be possible to reduce the decrease in intensity of light and the production of stray light. In this manner, the light guide plate unit may be able to reduce deterioration of quality of an image to be displayed.

Furthermore, the first wavelength component may be a wavelength component corresponding to red, and the second wavelength component may comprise a wavelength component corresponding to green and a wavelength component corresponding to blue.

According to the above-described aspect, the light guide plate unit may be able to contribute to displaying a full-color displayed image including three wavelength components of red, green, and blue, by causing a wavelength component corresponding to red to enter the first light guide plate and causing wavelength components corresponding to green and blue to enter the second light guide plate to guide light including the three wavelength components. Accordingly, the light guide plate unit may be able to further reduce deterioration of quality of the full-color displayed image.

Furthermore, the light guide plate unit may further include a transparent component that internally includes the first deflecting element and the second deflecting element.

According to the above-described aspect, since the transparent component supports the deflecting elements while transmitting light, the light guide plate unit may be able to maintain positions of the deflecting elements at their appropriate positions with higher precision, and as a result, the light guide plate unit may be able to maintain an optical path of light deflected by the deflecting elements more appropriately. This effect may be particularly prominent in a case where the light guide plate unit is disposed in an environment with vibration. Accordingly, it may be possible to reduce a deviation of an optical path of light by changes in positions of the deflecting elements and to reduce deterioration of quality of an image to be displayed. Therefore, the light guide plate unit may be able to further reduce deterioration of quality of an image to be displayed.

Furthermore, the light guide plate unit may further include: a third light guide plate; and a third deflecting element that causes light of a third wavelength component included in the incoming light to enter the third light guide plate.

According to the above-described aspect, the light guide plate unit causes beams of light of three wavelength components included in incoming light to enter three light guide plates by selectively deflecting the beams of light with deflecting elements. Thus, it may be possible to reduce the decrease in intensity of light and the production of stray light. In this manner, the light guide plate unit may be able to reduce deterioration of quality of an image to be displayed.

Furthermore, the third deflecting element may cause the light of a third wavelength component included in the incoming light to enter the third light guide plate, by selectively deflecting the light of the third wavelength component.

According to the above-described aspect, the light guide plate unit causes beams of light of three wavelength components included in incoming light to enter three light guide plates by utilizing the deflection by the deflecting elements. Thus, it may be possible to reduce the decrease in intensity of light and the production of stray light. In this manner, the light guide plate unit may be able to reduce deterioration of quality of an image to be displayed.

Furthermore, the first light guide plate may emit light guided by the first light guide plate, from a face that is on an opposite side from a face through which the incoming light entered; and the second light guide plate may emit light guided by the second light guide plate, from a face that is on an opposite side from a face through which the incoming light entered.

According to the above-described aspect, the light guide plate unit emits the light to the face that is on the opposite side from the face through which the incoming light entered. Therefore, in the case where a piece of equipment that emits the incoming light (e.g., corresponding to the image generating device) and a piece of equipment that receives the emitted light (e.g., corresponding to the windshield) are present on opposite sides across the light guide plate unit, the light guide plate unit may be able to guide the light appropriately between the pieces of equipment. Therefore, the light guide plate unit may be able to reduce deterioration of quality of an image to be displayed, while guiding the light appropriately.

Furthermore, the first light guide plate may emit light guided by the first light guide plate, from a face that is on a same side as a face through which the incoming light entered; and the second light guide plate may emit light guided by the second light guide plate, from a face that is on a same side as a face through which the incoming light entered.

According to the above-described aspect, the light guide plate unit emits the light to the face that is on the same side as the face through which the incoming light entered. Therefore, in the case where a piece of equipment that emits the incoming light (e.g., corresponding to the image generating device) and a piece of equipment that receives the emitted light (e.g., corresponding to the windshield) are present on the same side with respect to the light guide plate unit, the light guide plate unit may be able to guide the light appropriately between the pieces of equipment. Therefore, the light guide plate unit may be able to reduce deterioration of quality of an image to be displayed, while guiding the light appropriately.

Furthermore, a display device according to an aspect of the present embodiment is a display device that includes the above-described light guide unit and an image generating device that generates light showing an image and causes the light to enter the light guide plate unit.

According to the above-described aspect, it may be possible to reduce deterioration of quality of an image to be displayed, by using the light guide plate unit.

A light guide plate and a display device that reduce degradation of quality of an image to be displayed will be described in the present embodiment. A light guide plate and a display device in the present embodiment form a display device that displays an image on a windshield of a vehicle by projecting the image onto the windshield. Hereinafter, the description may be made with XYZ axes illustrated in figures.

Figure 9:
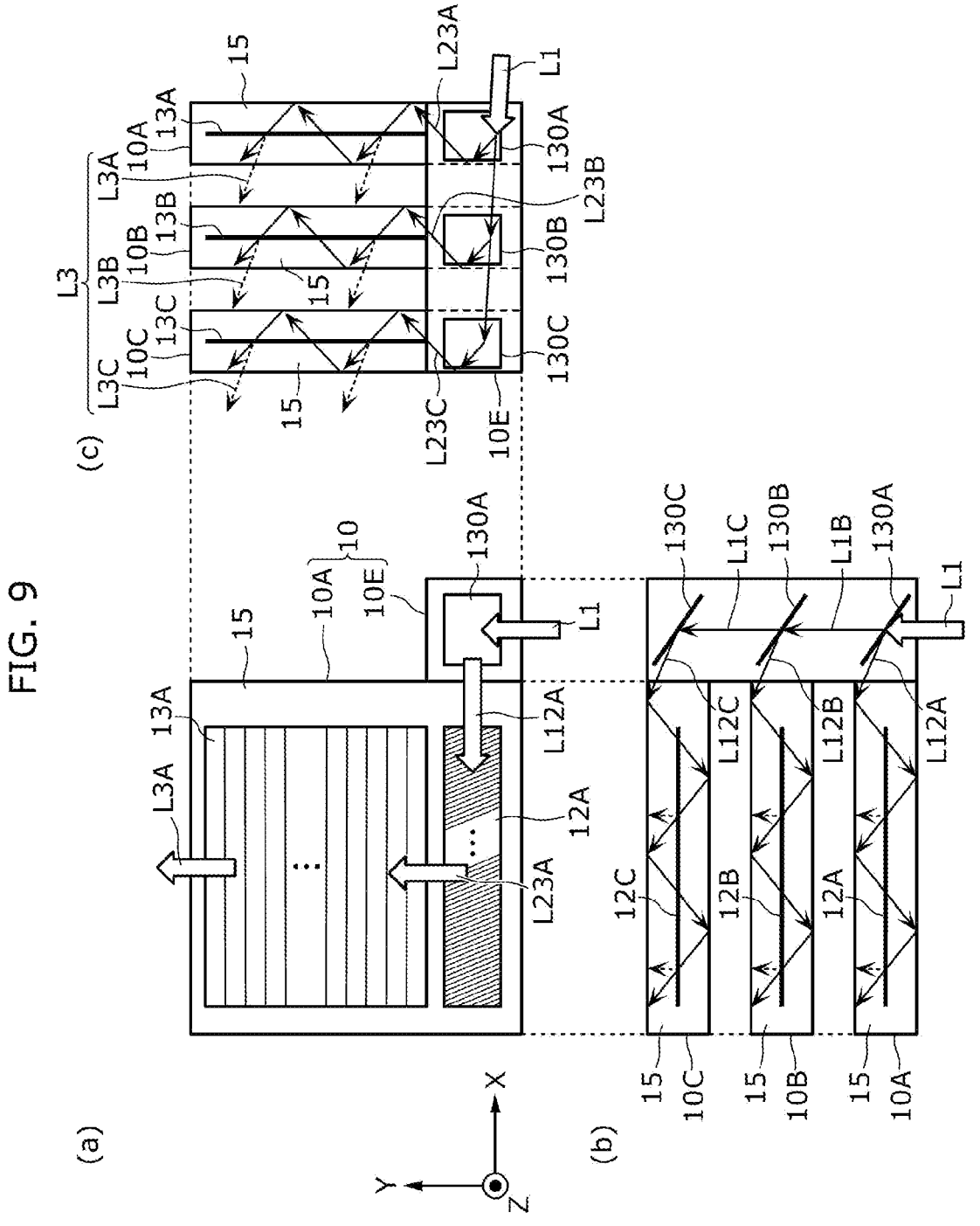
FIG. 9 is a schematic diagram illustrating a configuration of a light guide plate according to Embodiment 2.

FIG. 9 is a schematic diagram illustrating a configuration of light guide plate 10 according to the present embodiment. Light guide plate 10 is also referred to as a light guide plate unit.

In FIG. 9, (a) is a diagram illustrating a configuration of light guide plate 10 in a plan view, that is, as viewed from the Z-axis positive direction. In FIG. 9, (b) is a diagram illustrating a configuration of light guide plate 10 in a side view, that is, as viewed from the Y-axis negative direction. In FIG. 9, (c) is a diagram illustrating a configuration of light guide plate 10 in a side view, that is, as viewed from the X-axis positive direction.

As illustrated in FIG. 9, light guide plate 10 includes entrance component 10E and light guide bodies 10A, 10B, and 10C (also referred to as light guide body 10A and the like). Light guide body 10A and the like are disposed in an attitude in which they are parallel to one another. Light guide body 90A and the like are disposed at positions at which they are superposed on one another in a plan view. Light guide body 10A and the like are in the same shape, for example, but not limited to, the same rectangular shape, in a plan view.

In FIG. 9, (a) illustrates only light guide body 10A out of light guide body 10A and the like described above. The same description about (a) in FIG. 9 applies to light guide bodies 10B and 10C.

As illustrated in FIG. 9, light guide body 10A is a plate body that includes transparent component 15 and includes, in the inside or on a surface of transparent component 15, hologram elements 12A and 13A (also referred to as hologram element 12A and the like). Light guide body 10A guides, in the inside of light guide body 10A by total reflection, light L1 that has entered. Light guide body 10A emits, to the outside of light guide body 10A, light that is subjected to deflection through diffraction by hologram element 12A and the like as light L3A.

In light guide body 10A, hologram elements 12A and 13A are the same as hologram elements 12 and 13 in Embodiment 1. Therefore, light guide body 10A is equivalent to light guide plate 10 in Embodiment 1 from which hologram element 11 is excluded. Light guide body 10A and the like are each also referred to as a light guide plate.

Transparent component 15 is made of glass, resin, or the like.

Light L1 that enters entrance component 10E is light that travels in the Y-axis positive direction and the Z-axis positive direction. Light L1 is assumed to be display light generated by image generating device 17. In the state of using display device 1 (i.e., in the state where display device 1 is provided as illustrated in FIG. 2), light guide plate 10 is provided in such a position and an attitude that light L1 enters entrance component 10E at an appropriate angle illustrated in FIG. 9.

Entrance component 10E includes deflecting elements 130A, 130B, and 130C (also referred to as deflecting element 130A and the like). Entrance component 10E deflects light L1 with deflecting element 130A and the like to cause light L1 to enter light guide body 10A and the like. Entrance component 10E is a columnar body (e.g., rectangular parallelepiped) having a width that covers a zone where light guide body 10A and the like are present in a traveling direction of light L1.

Deflecting element 130A is a deflecting element that causes light of a predetermined wavelength component (also referred to as a first wavelength component) included in incoming light to enter light guide body 10A. Deflecting element 130A causes the light of the first wavelength component included in the incoming light to enter light guide body 10A by selectively deflecting the light of the first wavelength component. More specifically, deflecting element 130A is a deflecting element that causes the light of the first wavelength component included in the incoming light to enter light guide body 10A by selectively reflecting the light of the first wavelength component and transmitting light of wavelength components other than the first wavelength component included in the incoming light. Deflecting element 130A can be implemented with a wavelength selective mirror (dichroic mirror).

Deflecting element 130A deflects light L1 entering the inside of light guide plate 10 from the outside of light guide plate 10 to form light L12A and causes light L12A to propagate in the inside of light guide body 10A. Light L12A is light that travels in the X-axis negative direction. Light L12A propagates in the inside of light guide body 10A in the X-axis negative direction, repeating total reflection at interfaces between transparent component 15 and the air. Deflecting element 130A deflects light L1 in such a manner as to make an angle of incidence of light L12A with respect to the interface larger than a critical angle.

Deflecting element 130B is a deflecting element that causes light of a predetermined wavelength component (also referred to as a second wavelength component) included in incoming light to enter light guide body 10B. Deflecting element 130B causes the light of the second wavelength component included in the incoming light to enter light guide body 10B by selectively deflecting the light of the second wavelength component. More specifically, deflecting element 130B is a deflecting element that causes the light of the second wavelength component included in the incoming light to enter light guide body 10B by selectively reflecting the light of the second wavelength component and transmitting light of wavelength components other than the second wavelength component included in the incoming light. Deflecting element 130B can be implemented with a wavelength selective mirror (dichroic mirror). The second wavelength component is different from the first wavelength component.

Deflecting element 130B deflects light L1B transmitted by deflecting element 130A to form light L12B and causes light L12B to propagate in the inside of light guide body 10B. Light L12B is light that travels in the X-axis negative direction. Light L12B propagates in the inside of light guide body 10B in the X-axis negative direction, repeating total reflection at interfaces between transparent component 15 and the air. Deflecting element 130B deflects light L1B in such a manner as to make an angle of incidence of light L12B with respect to the interface larger than a critical angle.

Deflecting element 130C is a deflecting element that causes light of a predetermined wavelength component (also referred to as a third wavelength component) included in incoming light to enter light guide body 10C. Deflecting element 130C causes the light of the third wavelength component included in the incoming light to enter light guide body 10C by selectively deflecting the light of the third wavelength component. More specifically, deflecting element 130C is a deflecting element that causes the light of the third wavelength component included in the incoming light to enter light guide body 10C by reflecting the light of the third wavelength component and transmitting light of wavelength components other than the third wavelength component included in the incoming light. Deflecting element 130C can be implemented with a wavelength selective mirror (dichroic mirror). The third wavelength component is different from both the first wavelength component and the second wavelength component.

Deflecting element 130C deflects light L1C transmitted by deflecting element 130B to form light L12C and causes light L12C to propagate in the inside of light guide body 10C. Light L12C is light that travels in the X-axis negative direction. Light L12C propagates in the inside of light guide body 10C in the X-axis negative direction, repeating total reflection at interfaces between transparent component 15 and the air. Deflecting element 130C deflects light L1C in such a manner as to make an angle of incidence of light L12C with respect to the interface larger than a critical angle.

Deflecting element 130A and the like deflect beams of light L1, L1B, and L1C by the reflection or the transmission, in other words, without diffraction. Thus, an angle of diffraction does not vary with frequency. As a result, beams of light corresponding to the beams of light LA, LB, and LC, which are the beams of stray light in FIG. 8, are not produced.

Light guide body 10A includes hologram elements 12A and 13A. Light guide body 10B includes hologram elements 12B and 13B. Light guide body 10C includes hologram elements 12C and 13C.

Hologram elements 12A, 12B, 12C, 13A, 13B, and 13C are the same as the hologram elements included in light guide plate 90 and having the respective name and contribute to emission of light L3 as in the case of light guide plate 90.

In the state of using display device 1, light guide plate 10 is provided in such a position and an attitude that light L3 is emitted toward windshield 20. After being emitted from light guide plate 10, light L3 is reflected by windshield 20 and enters the eyes of user U.

Although the description is such that light L1 entering light guide plate 10 includes the plurality of wavelength components, the present configuration can be applied to a case where a plurality of beams of incoming light including their respective wavelength components enter light guide plate 10. In this case, deflecting elements 130A, 130B, and 130C need to be disposed in such a position and an attitude that beams of light L12A, L12B, and L12C enter, respectively, light guide bodies 10A, 10B, and 10C at angles illustrated in FIG. 9.

Figure 10:
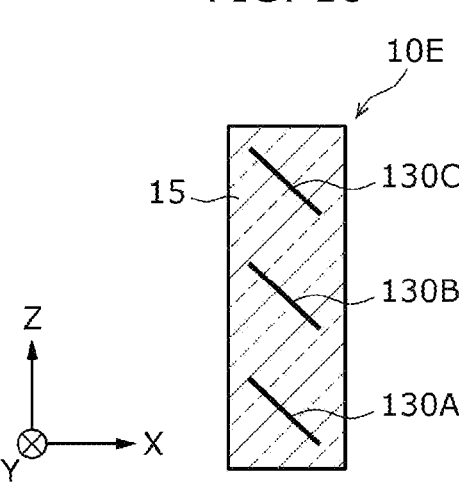
FIG. 10 is a schematic diagram illustrating a first example of an entrance component according to Embodiment 2.

FIG. 10 is a schematic diagram illustrating a first example of a configuration of entrance component 10E according to the present embodiment.

Entrance component 10E illustrated in FIG. 10 includes deflecting elements 130A, 130B, and 130C, and transparent component 15.

Transparent component 15 internally includes deflecting elements 130A, 130B, and 130C. Transparent component 15 supports deflecting element 130A and the like in such a manner that deflecting element 130A and the like take such positions and attitudes that deflecting element 130A and the like reflect beams of light L1, L1B, and L1C at appropriate angles.

Deflecting elements 130A, 130B, and 130C can be considered to be embedded inside transparent component 15. Of the inside of entrance component 10E, a space other than deflecting elements 130A, 130B, and 130C can be considered to be filled with transparent component 15.

With such a configuration, entrance component 10E can guide the beams of light L1, L1B, and L1C using deflecting element 130A and the like that are supported in their appropriate positions and attitudes with higher precision by transparent component 15 and can maintain an optical path of light being guided more appropriately. This effect is particularly prominent in the case where light guide plate 10 is disposed in an environment with vibration.

Figure 11:
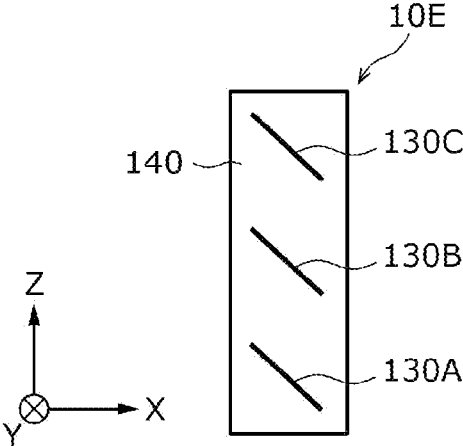
FIG. 11 is a schematic diagram illustrating a second example of an entrance component according to Embodiment 2.

FIG. 11 is a schematic diagram illustrating a second example of a configuration of entrance component 10E according to the present embodiment. Entrance component 10E illustrated in FIG. 11 shows a configuration different from the configuration of entrance component 10E illustrated in FIG. 10.

Entrance component 10E illustrated in FIG. 11 includes deflecting elements 130A, 130B, and 130C, and a supporting member (not illustrated).

Entrance component 10E is hollow. Deflecting elements 130A, 130B, and 130C are supported in space 140 in the inside of entrance component 10E by an appropriate supporting member in such a manner that deflecting elements 130A, 130B, and 130C take such positions and attitudes that deflecting elements 130A, 130B, and 130C reflect beams of light L1, L1B, and L1C at appropriate angles.

With such a configuration, entrance component 10E can guide the beams of light L1, L1B, and L1C using deflecting element 130A and the like that are supported in their appropriate positions and attitudes. In addition, such a configuration has an advantage of restraining an increase in weight.

Variation of Embodiment 2

Figure 12:
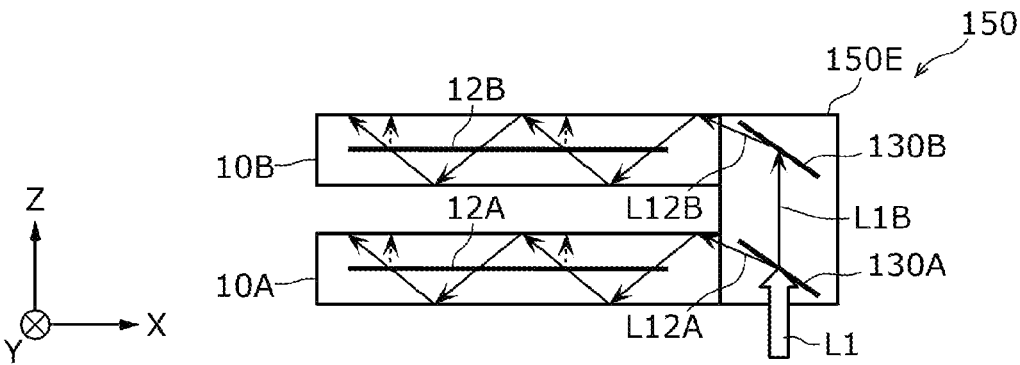
FIG. 12 is a schematic diagram illustrating a first example of a configuration of a light guide plate according to a variation of Embodiment 2.

FIG. 12 is a schematic diagram illustrating a configuration of light guide plate 150 as a first example of a configuration of a light guide plate according to the present variation.

Light guide plate 150 illustrated in FIG. 12 includes entrance component 150E, and light guide bodies 10A and 10B.

Entrance component 150E includes deflecting elements 130A and 130B.

Light L1 that enters light guide plate 150, that is, entrance component 150E is light that travels in the Y-axis positive direction and the Z-axis positive direction and enters light guide plate 150 through a face of light guide plate 150 on a Z-axis negative direction side of light guide plate 150.

Deflecting element 130A is a deflecting element that causes light of a predetermined wavelength component (also referred to as a first wavelength component) included in light L1 being the incoming light to enter light guide body 10A by selectively deflecting the light of the predetermined wavelength component. Deflecting element 130A corresponds to a first deflecting element. Deflecting element 130A is the same as deflecting element 130A in the above-described embodiment.

Deflecting element 130B is a deflecting element that causes light of a predetermined wavelength component (also referred to as a second wavelength component) included in light L1 being the incoming light to enter light guide body 10B by selectively deflecting the light of the predetermined wavelength component. Deflecting element 130B corresponds to a second deflecting element. Deflecting element 130B is the same as deflecting element 130B in the above-described embodiment.

In this manner, light guide body 10A emits light guided by light guide body 10A, from a face that is on an opposite side (i.e., a face on a Z-axis positive direction side) from a face through which light L1 entered (i.e., a face on a Z-axis negative direction side). Light guide body 10B emits light guided by light guide body 10B, from a face that is on an opposite side from a face through which light L1 entered.

Light L1 entering is, for example, light of wavelength components corresponding to two colors (e.g., red and green). In this case, for example, deflecting element 130A causes light of a wavelength component corresponding to red to enter light guide body 10A by deflecting the light and transmits light of the wavelength component corresponding to green. For example, deflecting element 130B causes light of a wavelength component corresponding to green to enter light guide body 10B by deflecting the light of the wavelength component corresponding to green. In this manner, light guide plate 150 can display a displayed image with the beams of light of red and green. This same description is established when red and green are switched. The two colors may be red and blue or may be green and blue.

Light L1 entering may be, for example, light of wavelength components corresponding to three colors (e.g., red, green, and blue).

In this case, for example, deflecting element 130A causes light of a wavelength component corresponding to red to enter light guide body 10A by deflecting the light and transmits beams of light of wavelength components corresponding to green and blue. For example, deflecting element 130B causes the beams of light of wavelength components corresponding to green and blue to enter light guide body 10B by deflecting the beams of light of the wavelength components corresponding to green and blue. In this manner, a displayed image with the beams of light of red, green, and blue can be displayed.

For example, deflecting element 130A may cause light of a wavelength component corresponding to blue to enter light guide body 10A by deflecting the light and may transmit beams of light of wavelength components corresponding to green and red. In this case, for example, deflecting element 130B causes the beams of light of wavelength components corresponding to green and red to enter light guide body 10B by deflecting the beams of light of the wavelength components corresponding to green and red. In this manner, a displayed image with the beams of light of red, green, and blue can be displayed.

Figure 13:
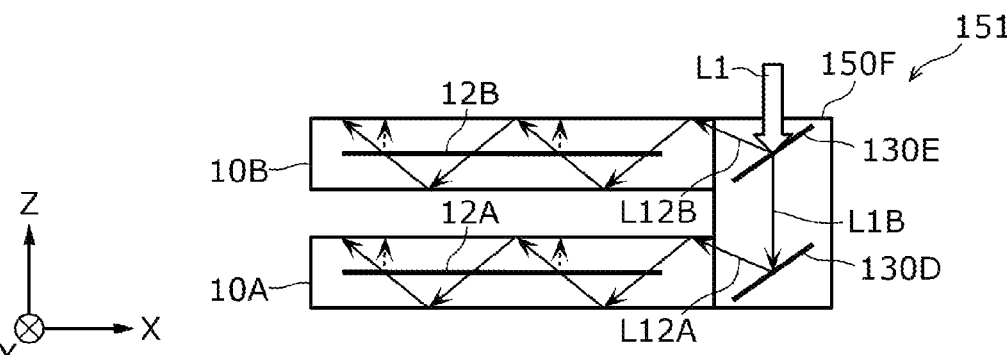
FIG. 13 is a schematic diagram illustrating a second example of a configuration of a light guide plate according to a variation of Embodiment 2.

FIG. 13 is a schematic diagram illustrating a configuration of light guide plate 151 as a second example of the configuration of the light guide plate according to the present variation.

Light guide plate 151 illustrated in FIG. 13 includes entrance component 150F, and light guide bodies 10A and 10B.

Entrance component 150F includes deflecting elements 130D and 130E.

Light L1 that enters light guide plate 151, that is, entrance component 150F is light that travels in the Y-axis positive direction and the Z-axis negative direction and enters light guide plate 151 through a face of light guide plate 151 on a Z-axis positive direction side of light guide plate 151.

Deflecting element 130D is a deflecting element that causes light of a predetermined wavelength component (also referred to as a first wavelength component) included in light L1 being incoming light to enter light guide body 10A. Deflecting element 130D corresponds to a first deflecting element. Deflecting element 130D has the same configuration as the configuration of deflecting element 130A included in light guide plate 150. However, a position and an attitude of deflecting element 130D can differ.

Deflecting element 130E is a deflecting element that causes light of a predetermined wavelength component (also referred to as a second wavelength component) included in light L1 being incoming light to enter light guide body 10B. Deflecting element 130E corresponds to a second deflecting element. Deflecting element 130E has the same configuration as the configuration of deflecting element 130B included in light guide plate 150. However, a position and an attitude of deflecting element 130E can differ.

In this configuration, light guide body 10A emits light guided by light guide body 10A, from a face that is on the same side (i.e., a face on a Z-axis positive direction side) as a face through which light L1 entered (i.e., a face on the Z-axis positive direction side). Light guide body 10B emits light guided by light guide body 10B, from a face that is on the same side as a face through which light L1 entered.

Figure 14:
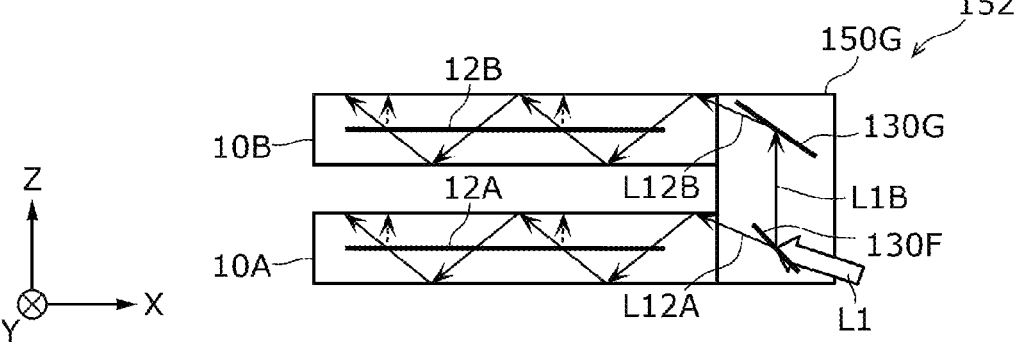
FIG. 14 is a schematic diagram illustrating a third example of a configuration of a light guide plate according to a variation of Embodiment 2.

FIG. 14 is a schematic diagram illustrating a configuration of light guide plate 152 as a third example of the configuration of the light guide plate according to the present variation.

Light guide plate 152 illustrated in FIG. 14 includes entrance component 150G, and light guide bodies 10A and 10B.

Entrance component 150G includes deflecting elements 130F and 130G.

Light L1 that enters light guide plate 152, that is, entrance component 150G is light that travels in the X-axis negative direction and the Z-axis positive direction and enters light guide plate 152 through a face of light guide plate 152 on an X-axis positive direction side of light guide plate 152.

Deflecting element 130F is a deflecting element that causes light of a predetermined wavelength component (also referred to as a first wavelength component) included in light L1 being incoming light to enter light guide body 10A. Deflecting element 130F causes the light of the predetermined wavelength component to enter light guide body 10A by transmitting the light and causes light of a wavelength component other than the predetermined wavelength component to travel toward deflecting element 130G by deflecting the light of the wavelength component other than the predetermined wavelength component. Deflecting element 130F corresponds to a first deflecting element. Deflecting element 130F has the same configuration as the configuration of deflecting element 130A included in light guide plate 150. However, a position and an attitude of deflecting element 130F can differ.

Deflecting element 130G is a deflecting element that causes light of a predetermined wavelength component (also referred to as a second wavelength component) included in light L1 being incoming light to enter light guide body 10B. Deflecting element 130G corresponds to a second deflecting element. Deflecting element 130G has the same configuration as the configuration of deflecting element 130B included in light guide plate 150. However, a position and an attitude of deflecting element 130G can differ.

In this configuration, light guide body 10A emits light guided by light guide body 10A, from a face (i.e., a face on a Z-axis positive direction side) that is neither on the same side as nor on an opposite side from a face through which light L1 entered (i.e., a face on the X-axis positive direction side). Light guide body 10B emits light guided by light guide body 10B, from a face that is neither on the same side as nor on an opposite side from a face through which light L1 entered.

As described above, the light guide plate according to the foregoing embodiment and the variation thereof causes beams of light of two wavelength components included in incoming light to enter two light guide bodies by selectively deflecting the beams of light with deflecting elements. Thus, it may be possible to reduce the decrease in intensity of light and the production of stray light. In this manner, the light guide plate may be able to reduce deterioration of quality of an image to be displayed.

Furthermore, the light guide plate causes beams of light of two wavelength components included in incoming light to enter two light guide bodies by utilizing the deflection by the deflecting elements. Thus, it may be possible to reduce the decrease in intensity of light and the production of stray light. In this manner, the light guide plate may be able to reduce deterioration of quality of an image to be displayed.

Furthermore, the light guide plate may be able to contribute to displaying a full-color displayed image including three wavelength components of red, green, and blue, by causing a wavelength component corresponding to red to enter the first light guide body and causing wavelength components corresponding to green and blue to enter the second light guide body to guide light including the three wavelength components. Accordingly, the light guide plate may be able to further reduce deterioration of quality of the full-color displayed image.

Furthermore, since the transparent component supports the deflecting elements while transmitting light, the light guide plate may be able to maintain positions of the deflecting elements at their appropriate positions with higher precision, and as a result, the light guide plate may be able to maintain an optical path of light deflected by the deflecting elements more appropriately. This effect may be particularly prominent in a case where the light guide plate is disposed in an environment with vibration. Accordingly, it may be possible to reduce a deviation of an optical path of light by changes in positions of the deflecting elements and to reduce deterioration of quality of an image to be displayed. Therefore, the light guide plate may be able to further reduce deterioration of quality of an image to be displayed.

Furthermore, the light guide plate causes beams of light of three wavelength components included in incoming light to enter three light guide bodies by selectively deflecting the beams of light with deflecting elements. Thus, it may be possible to reduce the decrease in intensity of light and the production of stray light. In this manner, the light guide plate may be able to reduce deterioration of quality of an image to be displayed.

Furthermore, the light guide plate causes beams of light of three wavelength components included in incoming light to enter three light guide bodies by utilizing the deflection by the deflecting elements. Thus, it may be possible to reduce the decrease in intensity of light and the production of stray light. In this manner, the light guide plate may be able to reduce deterioration of quality of an image to be displayed.

Furthermore, the light guide plate emits the light to the face that is on the opposite side from the face through which the incoming light entered. Therefore, in the case where a piece of equipment that emits the incoming light (e.g., corresponding to the image generating device) and a piece of equipment that receives the emitted light (e.g., corresponding to the windshield) are present on opposite sides across the light guide plate, the light guide plate may be able to guide the light appropriately between the pieces of equipment. Therefore, the light guide plate may be able to reduce deterioration of quality of an image to be displayed, while guiding the light appropriately.

Furthermore, the light guide plate emits the light to the face that is on the same side as the face through which the incoming light entered. Therefore, in the case where a piece of equipment that emits the incoming light (e.g., corresponding to the image generating device) and a piece of equipment that receives the emitted light (e.g., corresponding to the windshield) are present on the same side with respect to the light guide plate, the light guide plate may be able to guide the light appropriately between the pieces of equipment. Therefore, the light guide plate may be able to reduce deterioration of quality of an image to be displayed, while guiding the light appropriately.

Furthermore, the display device may be able to reduce deterioration of quality of a picture to be displayed, by using the light guide plate.

Although a light guide plate, and so on, according to one or more aspects have been described thus far based on the foregoing exemplary embodiment, the present disclosure is not limited to the foregoing embodiments. Forms obtained by making various modifications to the foregoing embodiments that can be conceived by those skilled in the art, as well as forms realized by arbitrarily combining structural components in different embodiments, without departing from the essence of the present disclosure, may be included in the one or more aspects.

While various embodiments have been described herein above, it is to be appreciated that various changes in form and detail may be made without departing from the spirit and scope of the present disclosure as presently or hereafter claimed.

FURTHER INFORMATION ABOUT
TECHNICAL BACKGROUND TO THIS
APPLICATION

The disclosures of the following patent applications including specification, drawings, and claims are incorporated herein by reference in their entirety: Japanese Patent Application No. 2021-058956 filed on Mar. 31, 2021, Japanese Patent Application No. 2021-058962 filed on Mar. 31, 2021, and PCT International Application No. PCT/JP2022/000017 filed on Jan. 4, 2022.

INDUSTRIAL APPLICABILITY

The present disclosure can be used in a head-up display device, and the like, of a vehicle.

The invention claimed is:

1. A light guide plate comprising:

a first hologram element; and a second hologram element, wherein the first hologram element includes interference fringes having intervals larger than intervals of interference fringes included in the second hologram element, the first hologram element is an emission-side hologram element, the second hologram element comprises two second hologram elements which are an entrance-side hologram element and a deflecting hologram element, the entrance-side hologram element is positioned to cause light that has entered from an outside to an inside of the light guide plate to propagate in the inside of the light guide plate by deflection through diffraction, the deflecting hologram element is positioned to cause the light deflected in a first direction by the entrance-side hologram element to propagate in the inside of the light guide plate in a second direction, crossing the first direction, by deflection through diffraction, and the emission-side hologram element is positioned to cause the light deflected by the deflecting hologram element to be emitted to the outside of the light guide plate by deflection through diffraction.

2. The light guide plate according to claim 1, wherein in a plan view, an area of the first hologram element is larger than an area of the second hologram element.

3. The light guide plate according to claim 1, wherein in a plan view, interference fringes included in the two or more diffraction cells included in the first hologram element are curved.

4. The light guide plate according to claim 1, wherein in a plan view, interference fringes included in the single diffraction cell included in the second hologram element are straight.

5. The light guide plate according to claim 1, wherein the first hologram element is a relief-type hologram element.

6. The light guide plate according to claim 1, wherein the second hologram element is a volume-type hologram element.

7. The light guide plate according to claim 1, wherein the first hologram element is positioned to cause light that has propagated in an inside of the light guide plate to be emitted to an outside of the light guide plate by deflection through diffraction.

8. The light guide plate according to claim 1, wherein the second hologram element is positioned to cause light that has entered from an outside to an inside of the light guide plate to propagate in the inside of the light guide plate by deflection through diffraction.

9. A display device comprising:

the light guide plate according to claim 1; and an image generating device that generates light showing an image, and causes the light to enter the light guide plate.

10. The light guide plate according to claim 1, wherein
the entrance-side hologram element and the deflecting
hologram element are adjacent to each other along the
first direction,
the deflecting hologram element and the emission-side
hologram element are adjacent to each other along the
second direction, and
the intervals of the interference fringes over the whole of
the emission-side hologram element are larger than the
intervals of the interference fringes over the whole of
the entrance-side hologram element and the deflecting
hologram element.

11. A light guide plate unit comprising:
a first light guide plate including a first hologram element
and a second hologram element;
a second light guide plate including a third hologram
element and a fourth hologram element;
a first deflecting element that causes light of a first
wavelength component included in incoming light to
enter the first light guide plate, by selectively deflecting
the light of the first wavelength component; and
a second deflecting element that causes light of a second
wavelength component included in the incoming light
to enter the second light guide plate, by selectively
deflecting the light of the second wavelength compo-
nent, wherein
the first hologram element and the third hologram element
include interference fringes having intervals larger than
intervals of interference fringes included in the second
hologram element and the fourth hologram element,
each of the first hologram element and the third hologram
element is an emission-side hologram element,
the second hologram element comprises two second holo-
gram elements and the fourth hologram element com-
prises two fourth hologram elements, each of the two
second hologram elements and the two fourth hologram
elements being an entrance-side hologram element and
a deflecting hologram element,
the entrance-side hologram element is positioned to cause
light that has entered from an outside to an inside of
each of the first light guide plate and the second light
guide plate to propagate in the inside of each of the first
light guide plate and the second light guide plate by
deflection through diffraction,
the deflecting hologram element is positioned to cause the
light deflected in a first direction by the entrance-side
hologram element to propagate in the inside of each of
the first light guide plate and the second light guide
plate in a second direction, crossing the first direction,
by deflection through diffraction, and
the emission-side hologram element is positioned to cause
the light deflected by the deflecting hologram element
to be emitted to the outside of each of the first light
guide plate and the second light guide plate by deflec-
tion through diffraction.

12. The light guide plate unit according to claim 11,
wherein
the first deflecting element causes the light of the first
wavelength component included in the incoming light
to enter the first light guide plate by selectively reflect-
ing the light of the first wavelength component and
transmitting light of a wavelength component other
than the first wavelength component included in the
incoming light, and
the second deflecting element causes the light of the
second wavelength component included in the incom-
ing light to enter the second light guide plate by selectively reflecting the light of the second wavelength
component and transmitting light of a wavelength
component other than the second wavelength compo-
nent included in the incoming light.

13. The light guide plate unit according to claim 11,
wherein
the first wavelength component is a wavelength compo-
nent corresponding to red, and
the second wavelength component comprises a wave-
length component corresponding to green and a wave-
length component corresponding to blue.

14. The light guide plate unit according to claim 11,
further comprising:
a transparent component that internally includes the first
deflecting element and the second deflecting element.

15. The light guide plate unit according to claim 11,
further comprising:
a third light guide plate; and
a third deflecting element that causes light of a third
wavelength component included in the incoming light
to enter the third light guide plate.

16. The light guide plate unit according to claim 15,
wherein
the third deflecting element causes the light of a third
wavelength component included in the incoming light
to enter the third light guide plate, by selectively
deflecting the light of the third wavelength component.

17. The light guide plate unit according to claim 11,
wherein
the first light guide plate emits light guided by the first
light guide plate, from a face that is on an opposite side
from a face through which the incoming light entered,
and
the second light guide plate emits light guided by the
second light guide plate, from a face that is on an
opposite side from a face through which the incoming
light entered.

18. The light guide plate unit according to claim 11,
wherein
the first light guide plate emits light guided by the first
light guide plate, from a face that is on a same side as
a face through which the incoming light entered, and
the second light guide plate emits light guided by the
second light guide plate, from a face that is on a same
side as a face through which the incoming light entered.

19. A display device comprising:
the light guide plate unit according to claim 11; and
an image generating device that generates light showing
an image, and causes the light to enter the light guide
plate unit.

20. The light guide plate unit according to claim 11,
wherein
the entrance-side hologram element and the deflecting
hologram element are adjacent to each other along the
first direction,
the deflecting hologram element and the emission-side
hologram element are adjacent to each other along the
second direction, and
the intervals of the interference fringes over the whole of
the emission-side hologram element are larger than the
intervals of the interference fringes over the whole of
the entrance-side hologram element and the deflecting
hologram element.

* * * * *